United States Patent [19]
Roovers et al.

[11] Patent Number: 5,366,416
[45] Date of Patent: Nov. 22, 1994

[54] CONTINUOUSLY VARIABLE TRANSMISSION WITH CONTROL SYSTEM

[75] Inventors: Wilhelmus C. W. M. Roovers, Prinsenbeek; Chi C. Choi, Eindhoven; Bastiaan A. d'Herripon, Tilburg, all of Netherlands

[73] Assignee: Van Doorne's Transmissie B.V., Netherlands

[21] Appl. No.: 29,835

[22] Filed: Mar. 11, 1993

[30] Foreign Application Priority Data

Apr. 6, 1992 [NL] Netherlands .................. 9200638

[51] Int. Cl.⁵ ............................................. F16H 59/00
[52] U.S. Cl. ..................................... 474/18; 474/28; 474/70
[58] Field of Search ................. 474/12, 18, 28, 70; 74/866, 867, 868; 364/424.1

[56] References Cited

U.S. PATENT DOCUMENTS

| | | | |
|---|---|---|---|
| 4,253,347 | 3/1981 | Mizuno et al. | 74/866 X |
| 4,509,125 | 4/1985 | Fattic et al. | 474/11 X |
| 4,670,843 | 6/1987 | Matsumura et al. | 364/424.1 |
| 4,679,486 | 3/1987 | Oshiage | 474/11 X |
| 4,710,879 | 12/1987 | Vahabzadeh | 474/12 X |
| 4,716,790 | 1/1988 | Sawada et al. | 74/866 |
| 4,718,012 | 1/1988 | Oshiage | 74/866 X |
| 4,926,716 | 5/1990 | Hirano et al. | 74/866 |
| 5,036,730 | 8/1991 | Sakai et al. | |

FOREIGN PATENT DOCUMENTS 0451887 10/1991 European Pat. Off.

OTHER PUBLICATIONS

Patent Abstracts of Japan, vol. 013, No. 090 (M-803)2 Maart 1989 & JP,A,63 284 041 (Daihatsu Motor Corp. Ltd.), 21 Nov. 1988.
Patent Abstracts of Japan, vol. 013, No. 281 (M-842) 27 Juni 1989 & JP,A,01 074 132 (Daihatsu Motor Corp. Ltd.) 20 Mar. 1989.

*Primary Examiner*—Roger J. Schoeppel
*Attorney, Agent, or Firm*—Pennie & Edmonds

[57] ABSTRACT

In a continuously variable transmission which is provided with a primary pulley and a secondary pulley, between which a driving belt is mounted, primary and secondary control systems, which are coupled to the respective pressure chambers of the axially translatable pulley discs, are employed to precipitate current pressure values, in dependence upon desired pressure values. To this end, the control system employs a regulator to which only the difference between the desired and the measured pressure-value is supplied, whereby the regulator nevertheless only has to regulate the relatively rapidly changing variation in a rest value supplied separately by a rest state device. This greatly improves the dynamic behaviour of the controller, so that rapid variations in the desired value of the entrant pressure can be effectively followed by the control system.

10 Claims, 1 Drawing Sheet

CONTINUOUSLY VARIABLE TRANSMISSION WITH CONTROL SYSTEM

FIELD OF THE INVENTION

The invention relates to a continuously variable transmission provided with a primary pulley and a secondary pulley, between which pulleys is mounted a driving belt, whereby each of the pulleys includes two discs, one of which discs is axially adjustable for the purpose of influencing the working radius of the driving belt by exerting desired hydraulic pressures in respective pressure chambers of the adjustable disc. The transmission is and provided with control systems connected to the respective pressure chambers, each of which control systems is provided with a feedback loop which includes a subtractor, a regulator which is connected to the subtractor, and a hydraulic pressure device mounted in a feedback loop to the subtractor.

BACKGROUND OF THE INVENTION

Transmissions as described above are known from EP-A-0 451 887 in which respective primary and secondary control means are connected to the pressure chambers of each of the adjustable pulley discs. The control means are embodied as feedback loops in which, on the basis of a difference-signal between a desired value and a measured value, the regulator provides a hydraulic pressure regulator with a signal which is used to precipitate the primary and secondary pressure in the pressure chambers of the adjustable pulley discs.

The disadvantage of the known transmission is that a swift response to a swift variation in the desired value of the supplied pressure is only possible for relatively large set trigger values or amplification factors in the regulator concerned, whence the probability of instability-occurrence in the control system shows a significant increase, with corresponding undesired increase in wear and reduction in efficiency of the transmission.

SUMMARY OF THE INVENTION

The invention aims to provide a continuously variable transmission in which the above-mentioned problems are significantly circumvented, and in which, most importantly, the transmission-efficiency is improved.

To this end, the continuously variable transmission according to the invention is characterised in that a summing unit is fitted between the regulator and the hydraulic pressure device, to which summing unit is supplied a rest state signal via an additive input of the summing unit, which rest state signal is furnished by a rest state device connected to the additive input, which rest state device has an input to which is supplied a signal which represents the desired value of the hydraulic pressure.

The advantage of the continuously variable transmission according to the invention is that, on the basis of the difference-signal between the desired pressure-value in the relevant pressure chamber and the corresponding measured pressure-value furnished by the hydraulic pressure device, the regulator will only precipitate and regulate typically small variations or disturbances, which variations are superimposed on the rest state signal in the summing unit.

The rest state device for the hydraulic pressure device lies in parallel with the subtractor and the regulator, thus yielding a transmission control system which can adapt swiftly to varying pressure in the system (measured and/or desired), and thereby nevertheless offers a reduced probability of occurrence of those undesired instabilities which in the past led to excessive slipping of the driving belt.

Most importantly, it appears that the absolute values of the regulator settings can be correspondingly reduced, without significant attendant changes in the practical freedom-of-control of the system.

In an embodiment of the transmission according to the invention, it is preferable to embody the rest state device in such a way that the form of the transfer function between the input and the output corresponds to the transfer function of the hydraulic device.

This has the advantage that one can make allowance for either linear or non-linear forms of the transfer function of the hydraulic pressure device, so that the regulator, working exclusively on the basis of the difference-signal passed to it, need only influence the variation in the static set value of the pressure device.

In a further embodiment of the transmission according to the invention, a signal giving a measure of the desired value of the secondary pressure in the pressure chamber of the secondary pulley is fed to the subtractor of the secondary control system, whereby the pressure in the pressure chamber of the secondary pulley is then fed back to the summing unit for the purpose of determining therein the difference between the desired value and the measured value of the secondary pressure.

The advantage of this embodiment is that it allows, in particular, the secondary pressure in the secondary pulley, with which the tension in the driving belt is influenced, to react rapidly to any variations in the moment which is to be transmitted. Because the transmission according to the invention also guarantees a faster response, it becomes technically possible to anticipate, in particular, the faster impulsive moments which are passed to the transmission from the vehicle's wheels. Such impulsive moments not only cause slipping of the driving belt in the transmission, but can also precipitate undesirable (audible) vibration and resonance in the vehicle itself, and can now be counteracted using the control system according to the invention.

In a preferential embodiment, the transmission according to the invention is characterised in that a vibration sensor is mounted on at least one of the outgoing or driving shafts, which vibration sensor is coupled to the summing unit in the secondary control system.

This has the advantage that it allows compensation of those impulsive moments which originate from the surface of the road. Compensation occurs when possible vibrations passed from the wheels to the transmission are eliminated by a counteractive variation in the tension of the driving belt.

In a further preferential embodiment of the transmission according to the invention, it is preferable to have adjustable filter-phase means fitted between the motion sensor and the summing unit, so that not only the extent of compensation, but also the specific frequency- and phase-region in which compensation of the disturbing vibrations is to occur, can be influenced as desired.

In a particular preferential embodiment, the regulator in the transmission according to the invention is embodied so as to ensure variable adjustment of the PID actions according to the rules of Fuzzy Logic.

This has the advantage that, in applying the rules of Fuzzy Logic in regulating the required pressures in the respective primary and secondary pressure chambers of the transmission, the suitability of the control process in practical situations is extended, in the case of a limitation of the calculating capacity usually required of the regulator. Often, variable quantities such as, for example, the velocity of the vehicle, the accelerations in different directions, the current transmission ratio, the signal from the vibration sensor, the engine speed, the position of the accelerator pedal, etc., will be passed to the regulator, all of which quantities, depending (among other things) on their relative ratios and magnitudes and the extent to which they are considered relevant, can, according to a set of intrinsically logical rules whose application is nevertheless uncertain and depends specifically on the quantities involved, lead to a revision of the current PID action values of the regulator.

BRIEF DESCRIPTION OF THE DRAWINGS

The invention and its associated advantages will be further elucidated using the following drawings, of which is depicted.

DETAILED DESCRIPTION OF THE INVENTION

Figure 1:
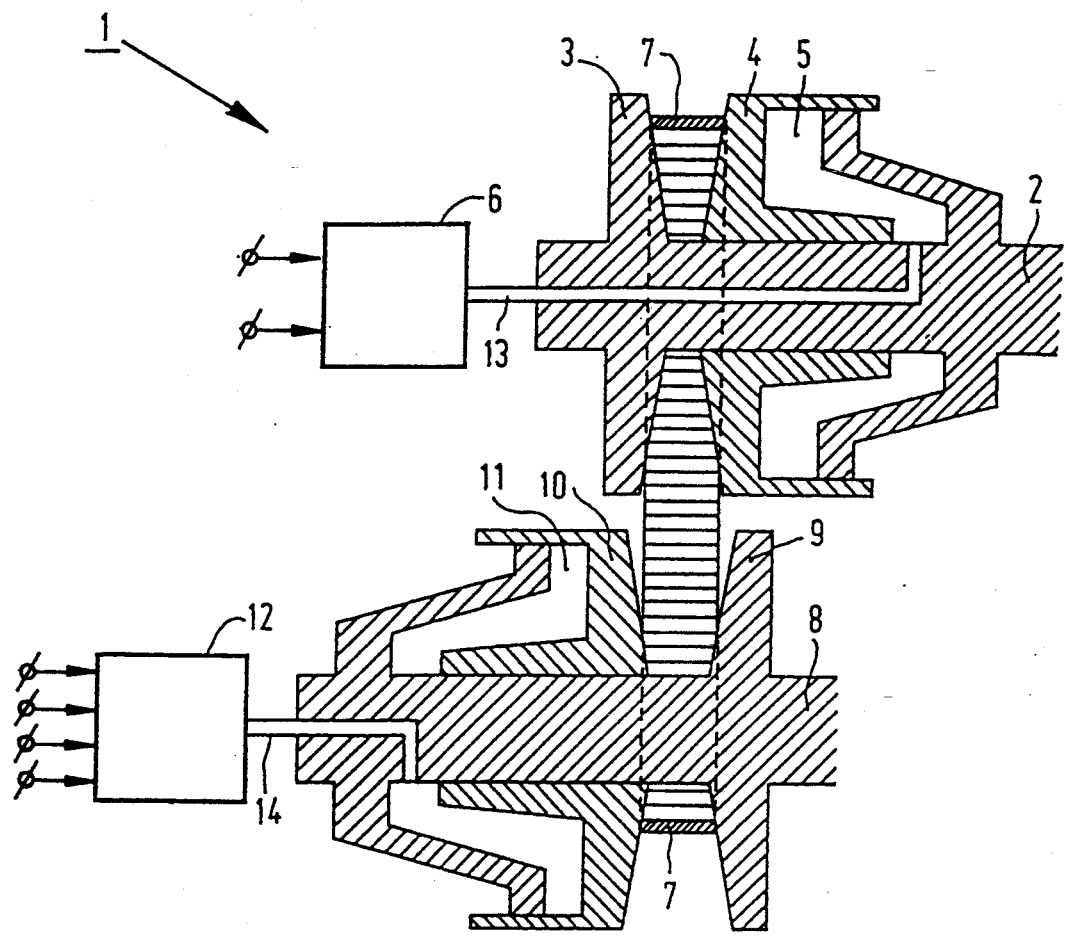
FIG. 1 is a schematic rendition of a relevant part of a known continuously variable transmission.

FIG. 1 shows a relevant part of a continuously variable transmission 1. The transmission 1 includes a primary shaft 2, on which is mounted a primary pulley in the form of primary conical pulley discs 3 and 4, whereby pulley disc 3 is fixed to the primary shaft 2, and whereby the primary pulley disc 4 can be displaced along the shaft 2 by exertion of a hydraulic pressure in a primary pressure chamber 5. Control of the pressure in the primary pressure chamber 5 occurs via a primary control system 6 connected to the pressure chamber 5, the function of which primary control system 6 is to regulate the pressure in the pressure chamber 5 so as to adjust the working radius of a driving belt 7 mounted between the pulley discs 3 and 4.

The transmission 1 also includes a secondary shaft 8, on which is mounted a pulley which possesses secondary pulley discs 9 and 10, whereby the pulley disc 9 is fixed to the shaft 8, and the pulley disc 10 is mounted so that it can be displaced along the shaft 8. The pulley disc 10, which can be displaced axially along the shaft 8, is translated by exerting a hydraulic pressure in a secondary pressure chamber 11 which is connected to a secondary control system 12.

The respective control systems 6 and 12 are connected by means of the respective ducts 13 and 14 to the respective pressure chambers 5 and 11. The driving belt 7 also runs between pulley discs 9 and 10, and its working radius is influenced by employing control system 6 to exert an appropriate pressure in the pressure chamber 5, whereas the tension in the driving belt 7 is maintained by employing control system 12 to exert an appropriate pressure in the secondary pressure chamber 11.

Signals are supplied to the systems 6 and 12 via input terminals, on the basis of which signals are determined the values of the respective pressures P(prim) and P(sec) in the respective pressure chambers 5 and 11. Further details can be found in EP-A-0 451 887.

In the systems 6 and 12, calculations occur which eventually result in a particular desired momentary pressure in the pressure chambers 5 and 11.

Figure 2:
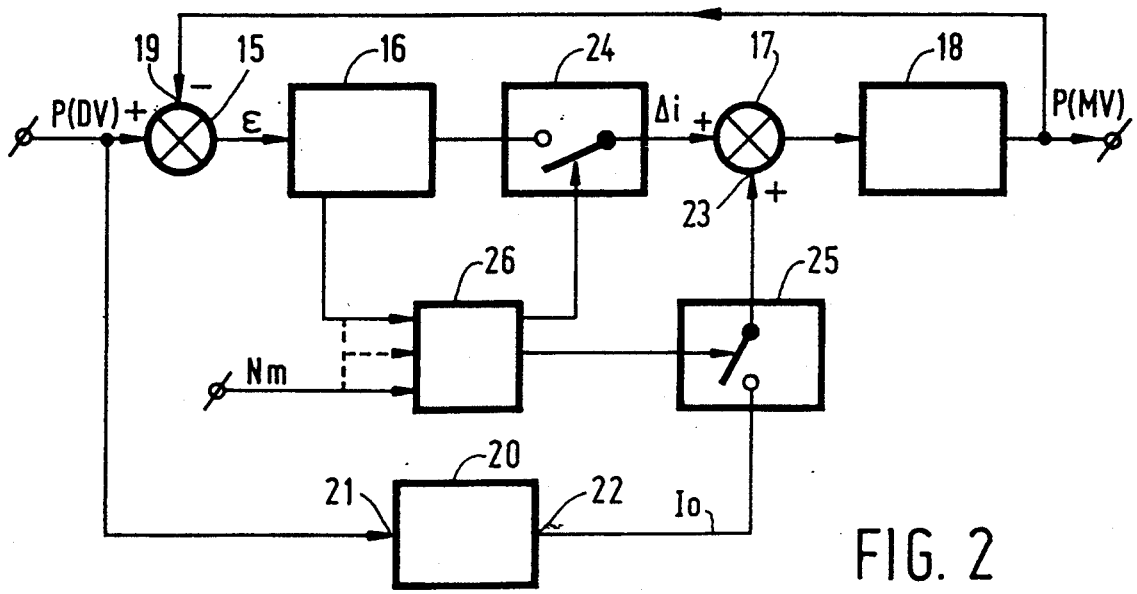
FIG. 2 shows a control system which is suitable for application in control means of the continuously variable transmission according to the invention.

FIG. 2 gives a schematic depiction of a control system (generally electronically simulated), which can be applied in the control systems 6 and 12. The controller may be viewed, in principle, as a model for both control systems, but modifications can of course be employed, if so desired. The control system drawn in FIG. 2 includes a terminal P(DV), to which a subtractor 15, a regulator 16, a summing unit 17 and a hydraulic pressure device 18 are successively connected in series. The output signal of the pressure device 18 provides the measured value of the pressure, denoted by P(MV), and this signal is fed back to the inverting input 19 of the subtractor 15. The control system also includes a rest state device 20 with an input 21 and an output 22, whereby the input 21 is connected to the terminal P(DV) and the output 22 is connected to the additive input of the summing device 17.

The pressure control system for the transmission employs the difference $\epsilon$ between the desired pressure value P(DV) and P(MV), with the assistance of the PID regulator 16, to determine the variation i in an adjusted rest value $I_o$. The sum of these two is supplied to the hydraulic pressure device 18, so as to precipitate a current or measured pressure value in either the primary pressure chamber 5 or the secondary pressure chamber. The rest value $I_o$ is derived by the rest state device from the desired pressure value P(DV). Rapid variations in the pressure value signal P(DV) are therefore processed proportionally by the device 20 so as to obtain the adjusted rest value $I_o$, while the difference-signal $\epsilon$ is zeroed via precipitation of the signal i, allowing the PID regulator 16 to be set to a 'tame' state and reducing the probability of occurrence of instability.

The regulator 16 can possess many non-depicted inputs, for the purpose of supplying it with quantities such as, for example, the velocity of the vehicle, the acceleration of the vehicle in various directions, the current transmission ratio, the signal from a vibration sensor to be mounted on the wheel axes, the engine speed, the position of the accelerator pedal, etc. The respective P, I and D actions of the regulator can be adjusted on the basis of these. For example, adjustment of these values can occur dynamically, whereby the rules according to which the settings can be altered preferably correspond to the rules as set out in the theory of so-called Fuzzy Logic. The consequence of controlling the system on the basis of the rules of Fuzzy Logic is such that, in employing the rules to define the optimal values of the sought current pressure, an adequate control system for influencing the pressure in the primary and the secondary pressure chambers 5 and 11 is guaranteed under every conceivable practical circumstance.

Under the circumstances, it is advantageous to endow the regulator 16 with non-linear properties, so as to optimise the regulator's suitability to the hydraulic pressure device 18. In such an instance, a non-linear relationship exists between the proportional action (P) of the regulator and the difference-value $\epsilon$.

The motional sensor coupled to the summing unit 17 and the regulator 16 provides information concerning the character of the road, on the basis of which signal the regulator 16 can be so adjusted that, in applying the control system as secondary control system 12, variations can be precipitated in the tension of the driving belt 7, which then compensate moment-variations arising from the surface roughness of the road. In this way, one achieves an extremely advanced transmission system, which contributes greatly to the comfort of the vehicle as experienced by the passenger.

It should be clear that the invention is not restricted to the depicted embodiment, and that, within the confines of the invention, other different embodiments can be imagined, which must equally be viewed as pertaining to the invention. One might, for example, mount one or more switches 24, 25 between the regulator 16 and the summing unit 17, and/or between the rest state device 20 and the summing unit 17. In this way, one can easily choose whether or not to use the regulator 16 and the rest state device 20. This has the advantage that, during temporary instabilities in the controller (at a particular engine operation frequency, for example), one of both regulators will be stalled and, for example, temporary use will be made of regulator 16 only. Above all, in the event of process-changes in relation to and in dependence upon the working conditions, a single control-adjustment will now suffice, and further control-adjustments will be unnecessary.

The switches 24 and 25 can, for example, be triggered on the basis of a signal supplied to a logic unit 26 by a regulator 6, which logic unit can also be used to trigger the switches 24, 25 using other variables, such as the engine operation frequency Nm.

We claim:

1. Continuously variable transmission (1) provided with a primary pulley and a secondary conical pulley, between which pulleys is mounted a driving belt (7), whereby each of the pulleys includes a pair of discs (3, 4; 9, 10), one of which discs (4, 10) is axially adjustable for the purpose of influencing the working radius of the driving belt (7) by exerting desired hydraulic pressures in respective pressure chambers (5, 11) of the adjustable disc (4, 10), and provided with control systems (6, 12) connected to the respective pressure chambers (5, 11), each of which control systems is provided with a feedback loop which includes a subtractor (15), a regulator (16) which is connected to the subtractor (15), and a hydraulic pressure device (18) mounted in a feedback loop to the subtractor (15), characterised in that a summing unit (17) is fitted between the regulator (16) and the hydraulic pressure device (18), to which summing unit (17) is supplied a rest state signal via an additive input (23) of the summing unit (17), which rest state signal (23) is furnished by a rest state device (20) connected to the additive input (23), which rest state device (20) has an input (21) to which is supplied a signal which represents the desired value of the hydraulic pressure.

2. Continuously variable transmission according to claim 1, in which the rest state device (20) possesses a transfer function between input and output which is tailored to a transfer function of the hydraulic pressure device (18).

3. Continuously variable transmission according to claim 1 or 2, in which the secondary pulley (9, 10) is connected to a pressure chamber (11) having a secondary pressure, which pressure chamber (11) is governed by a secondary control system (12), and in which a signal giving a measure of the desired value of the secondary pressure in the pressure chamber (11) of the secondary pulley (9, 10) is supplied to the subtractor (15) of the secondary control system (12), and in which the pressure in the pressure chamber (11) of the secondary pulley (9, 10) is fed back to the summing unit (17) for the purpose of determining therein the difference ($\epsilon$) between the desired value and the measured value of the secondary pressure P(sec).

4. Continuously variable transmission according to claim 3, in which a motion sensor is mounted on at least one of the outgoing or driving shafts (8) of the transmission (1), which motion sensor is coupled to the summing unit (17) in the secondary control system (12).

5. Continuously variable transmission according to claim 4, in which adjustable filter-phase means are mounted between the motion sensor and the summing unit.

6. Continuously variable transmission according to claim 1, whereby the action of the regular (16) is governed by Fuzzy Logic.

7. Continuously variable transmission according to claim 1, whereby a switch (24, 25), which is provided with a control input, is included in at least one of two signal paths, formed on the one hand by the subtractor (15) and the regulator (16), and on the other hand by the rest state device (20), whereby the control input is connected to a logic unit provided with at least one input, said logic unit throwing the switch on and off according to indication signals supplied to the input of the logic unit.

8. Continuously variable transmission according to claim 7, whereby the regulator (16) and the summing unit (17) are connected by signal paths, and the switch (24) is fitted in one of said signal paths between the regulator (16) and the summing unit (17), and whereby the rest state device (20) and the additive input (23) of the summing unit are connected by another signal path, the switch (25) being fitted in said other signal path.

9. Continuously variable transmission according to claim 7, whereby the input of the logic unit is connected to terminals, to which are supplied signal which characterise the service conditions under which the transmission is operating.

10. Continuously variable transmission according to claim 9, whereby a first input terminal of the logic unit is connected to the regulator (16), whereby the regulator (16) is so embodied that the first input terminal is supplied with a signal which contains an indication of the stability or temporary instability of the control system (6, 12), and/or a second input terminal is supplied with a signal which contains a measure of the current operating frequency of the engine (Nm) to which the transmission is connected.

* * * * *